US008693141B1

(12) United States Patent
Elliott et al.

(10) Patent No.: US 8,693,141 B1
(45) Date of Patent: Apr. 8, 2014

(54) SYSTEMS AND METHODS FOR PROVIDING STACKED WRITER LEADS FOR MAGNETIC TRANSDUCERS

(75) Inventors: Carl F. Elliott, Eden Prairie, MN (US); Zhigang Bai, Milpitas, CA (US); Tao Pan, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 220 days.

(21) Appl. No.: 13/291,766

(22) Filed: Nov. 8, 2011

(51) Int. Cl.
*G11B 5/48* (2006.01)

(52) U.S. Cl.
USPC .......................................................... 360/123.1

(58) Field of Classification Search
USPC ....................................................... 360/123.1
See application file for complete search history.

(56) References Cited

U.S. PATENT DOCUMENTS

| 5,986,853 | A | * | 11/1999 | Simmons et al. | 360/245.9 |
| 5,995,328 | A | * | 11/1999 | Balakrishnan | 360/245.9 |
| 7,813,082 | B2 | * | 10/2010 | Rice et al. | 360/245.9 |
| 7,835,112 | B2 | * | 11/2010 | Danielson et al. | 360/245 |
| 7,986,494 | B2 | * | 7/2011 | Pro | 360/245.9 |
| 8,094,413 | B1 | * | 1/2012 | Hentges et al. | 360/245.9 |
| 8,130,471 | B1 | * | 3/2012 | German et al. | 360/245.9 |
| 8,169,746 | B1 | * | 5/2012 | Rice et al. | 360/245.9 |
| 8,462,464 | B1 | * | 6/2013 | Dunn | 360/245.9 |
| 2008/0180850 | A1 | * | 7/2008 | Rice et al. | 360/245.9 |
| 2008/0273266 | A1 | * | 11/2008 | Pro | 360/234.5 |
| 2008/0273269 | A1 | * | 11/2008 | Pro | 360/234.6 |

* cited by examiner

*Primary Examiner* — Mark Blouin

(57) ABSTRACT

Systems and methods for providing stacked writer leads for magnetic transducers used in disk drives are provided. One such system for providing stacked writer leads for a magnetic transducer includes a writer coil for the magnetic transducer, a first pad on the magnetic transducer, a second pad on the magnetic transducer, a first circuit trace coupled to the first pad and a first terminal of the writer coil, and a second circuit trace coupled to the second pad and a second terminal of the writer coil, where a preselected length of the first circuit trace and the second circuit trace is configured in a stacked configuration where each of the preselected lengths of the first circuit trace and the second circuit trace is positioned at about the same location in spaced apart planes.

26 Claims, 6 Drawing Sheets

SYSTEMS AND METHODS FOR PROVIDING STACKED WRITER LEADS FOR MAGNETIC TRANSDUCERS

FIELD

The present invention relates generally to disk drive technology, and more specifically, to systems and methods for providing stacked writer leads for magnetic transducers used in disk drives.

BACKGROUND

An important advantage of disk drive technology is high storage capacity at relatively lower cost compared to flash memory. In addition to areal density, increases in linear density for a given revolution per minute (rpm) and form factor of drive increase the maximum data rate. Server applications where access to large amounts of mission critical data is essential also require high data rates. High data rates can be important for both conventional and electrically assisted magnetic recording (EAMR) recording technology. Innovations in head design, coil design and magnetic materials are necessary to achieve high data rates.

Coil designs in particular can be important for achieving high data rates. Coil designs for writers can be used in both conventional perpendicular and EAMR heads. For high data rate recording in the gigahertz (GHz) range, it can be important to optimize the electrical path and connections from the preamplifier to the write coil. Historically, the majority of work in this area has been focused on the interconnect design with little attention paid to the electrical design inside the slider.

SUMMARY

Aspects of the invention relate to systems and methods for providing stacked writer leads for magnetic transducers used in disk drives. In one embodiment, the invention relates to a system for providing stacked writer leads for a magnetic transducer, the system including a writer coil for the magnetic transducer, a first pad on the magnetic transducer, a second pad on the magnetic transducer, a first circuit trace coupled to the first pad and a first terminal of the writer coil, and a second circuit trace coupled to the second pad and a second terminal of the writer coil, where a preselected length of the first circuit trace and the second circuit trace is configured in a stacked configuration where each of the preselected lengths of the first circuit trace and the second circuit trace is positioned at about the same location in spaced apart planes.

In another embodiment, the invention relates to a method for providing stacked writer leads for a magnetic transducer, the method including forming a writer coil for the magnetic transducer, forming a first circuit trace on a first layer, the first circuit trace coupled to a first terminal of the writer coil, forming a second circuit trace on a second layer on top of, and spaced apart, from the first layer, the second circuit trace coupled to a second terminal of the writer coil, forming a first pad and a second pad on the magnetic transducer, the first pad coupled to the first circuit trace and the second pad coupled to the second circuit trace, where a preselected length of the first circuit trace and the second circuit trace is configured in a stacked configuration where the preselected lengths of the first circuit trace and the second circuit trace are positioned at about the same location in the spaced apart layers.

DETAILED DESCRIPTION

Figure 1:
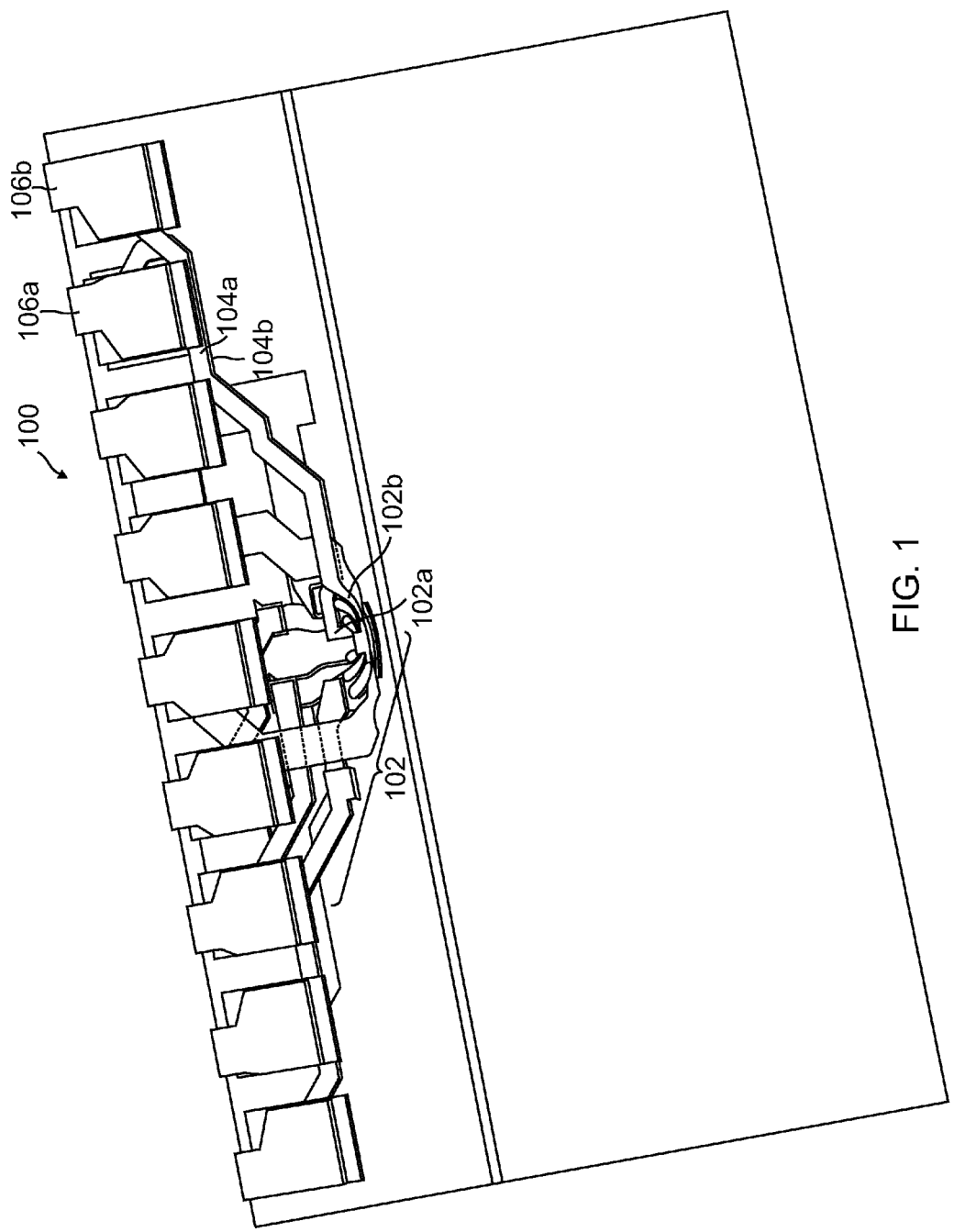
FIG. 1 is a perspective view of a slider including a write coil having stacked writer leads coupled to pads on the slider in accordance with one embodiment of the invention.

Referring now to the drawings, embodiments of sliders having stacked writer leads and processes for manufacturing the sliders are illustrated. Each slider has stacked writer leads which include a first circuit trace coupled to a first pad on the slider and a second circuit trace coupled to a second pad on the slider, where a preselected length of each of the circuit traces is positioned at about the same location in spaced apart planes. The stacked writer leads can provide a preselected amount of capacitive coupling that corresponds to the preselected length and compensates for the inductance of the writer coil. In such case, the high frequency impedance of a writer coil circuit including the stacked writer traces and write coil can be reduced, thereby enabling increased write speeds and high data rates.

FIG. 1 is a perspective view of a slider 100 including a write coil 102 having stacked writer leads (104a, 104b) coupled to pads (106a, 106b) on the slider 100 in accordance with one embodiment of the invention. The write coil 102 includes a first terminal 102a that is coupled to a first circuit trace or first writer lead 104a. The first circuit trace 104a extends along a first layer to the first pad 106a by way of a via (not shown but see 108a in FIG. 2). Similarly, the second circuit trace 104b extends along a second layer to the second pad 106b by way of a via (not shown in FIG. 1 but see 108b in FIG. 2). The second trace 104b is spaced apart from and on top of the first trace 104a to achieve a preselected amount of capacitive coupling. The write coil 102 further includes a second terminal 102b that is coupled to the second circuit trace 104b.

In a number of embodiments, the slider can be positioned above a magnetic media for reading and writing information to the media in a disk storage device. More specifically, the write coil 102 is configured to generate a magnetic field to write information to the media. In such case, the capacitive coupling provided by the stacked writer leads (e.g., stacked configuration) can lower the impedance at high frequencies and thereby allow for reading and writing information at high data rates.

In a number of embodiments, the write coil 102 can be formed of a conductive material such as Cu or another suitable conductive material. In several embodiments, the write coil 102 can be formed using any number of manufacturing processes known in the art. In one embodiment, the write coil 102 and first circuit trace 104a are positioned on the same layer and formed at about the same time. In some embodiments, the write coil 102 and first circuit trace 104a are not positioned on the same layer and are formed at different times. In several embodiments, the first and second circuit traces (104a, 104b) are formed of one or more conductive materials (e.g., Cu) using any number of manufacturing processes known in the art.

In a number of embodiments, a flexible cable (not shown) having pads arranged in a configuration matching that of slider 100 is attached to the slider pads using ultrasonic bonding or other suitable bonding techniques known in the art. The flexible cable provides a medium for signals from preamplifier circuitry to be sent to and received from the slider 100. In several embodiments, the first pad 106a and second pad 106b receive differential write signals travelling along the flexible cable from the preamplifier circuitry.

Figure 2:
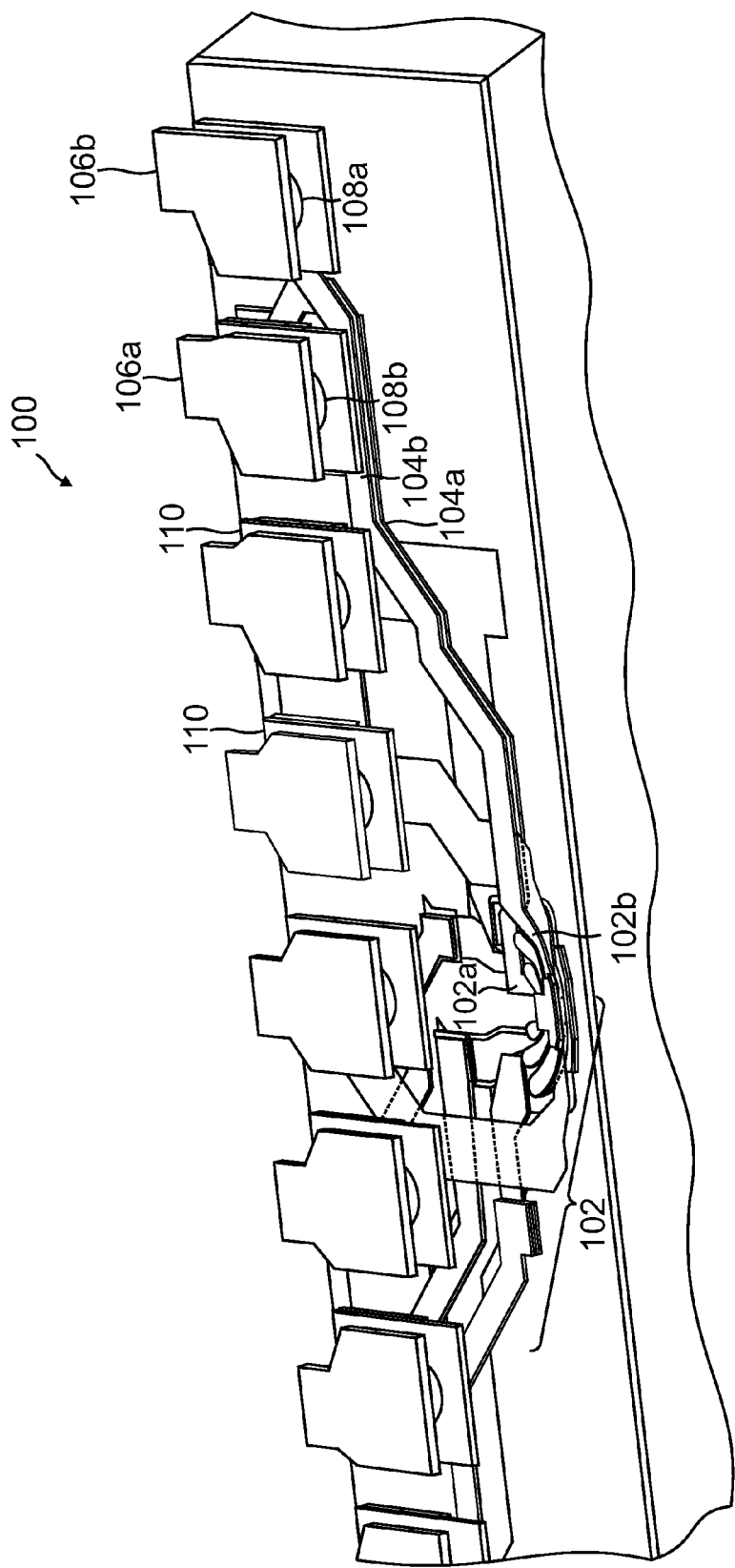
FIG. 2 is a upper perspective view of a portion of the slider of FIG. 1 illustrating the write coil having the stacked writer leads coupled to the pads of the slider in accordance with one embodiment of the invention.

FIG. 2 is a upper perspective view of a portion of the slider 100 of FIG. 1 illustrating the write coil 102 having the stacked writer leads (104a, 104b) coupled to the pads (106a, 106b) of the slider 100 in accordance with one embodiment of the invention. Via 108a couples the first circuit trace or first stacked writer lead 104a to the first pad 106a. Similarly, via 108b couples the second circuit trace or second stacked writer lead 104b to the second pad 106b. Probe plates 110 are positioned along the vias below each pad. These probe plates 110 may however be removed during manufacturing (e.g., after manufacturing testing has been performed).

Figure 3:
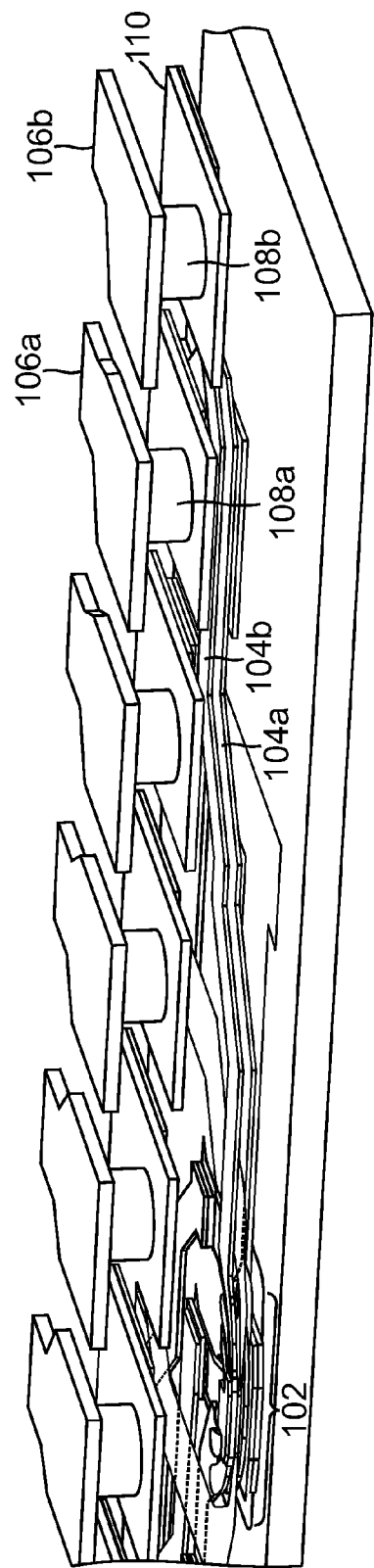
FIG. 3 is a lower perspective view of a portion of the slider of FIG. 1 illustrating the write coil having the stacked writer leads coupled to the pads of the slider in accordance with one embodiment of the invention.

FIG. 3 is a lower perspective view of a portion of the slider 100 of FIG. 1 illustrating the write coil 102 having the stacked writer leads (104a, 104b) coupled to the pads (106a, 106b) of the slider 100 by way of vias (108a, 108b), respectively, in accordance with one embodiment of the invention.

Figure 4:
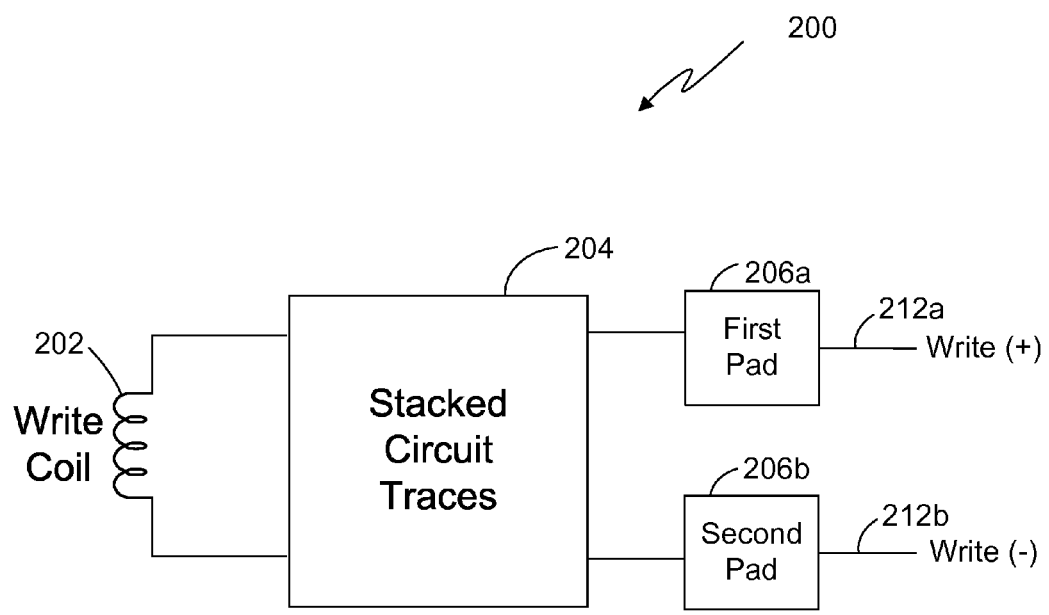
FIG. 4 is a schematic block diagram of a writer coil circuit including a write coil coupled by stacked circuit traces to first and second slider pads in accordance with one embodiment of the invention.

FIG. 4 is a schematic block diagram of a writer coil circuit 200 including a write coil 202 coupled by stacked circuit traces 204 to first and second slider pads (206a, 206b) in accordance with one embodiment of the invention. The first and second slider pads (206a, 206b) are coupled to differential write signals (212a, 212b) which can be provided via a flexible circuit (not shown) coupled to a preamplifier circuit (not shown). In other embodiments, other slider signals and their corresponding circuit traces can be positioned in a stacked configuration to control or reduce impedance.

Figure 5:
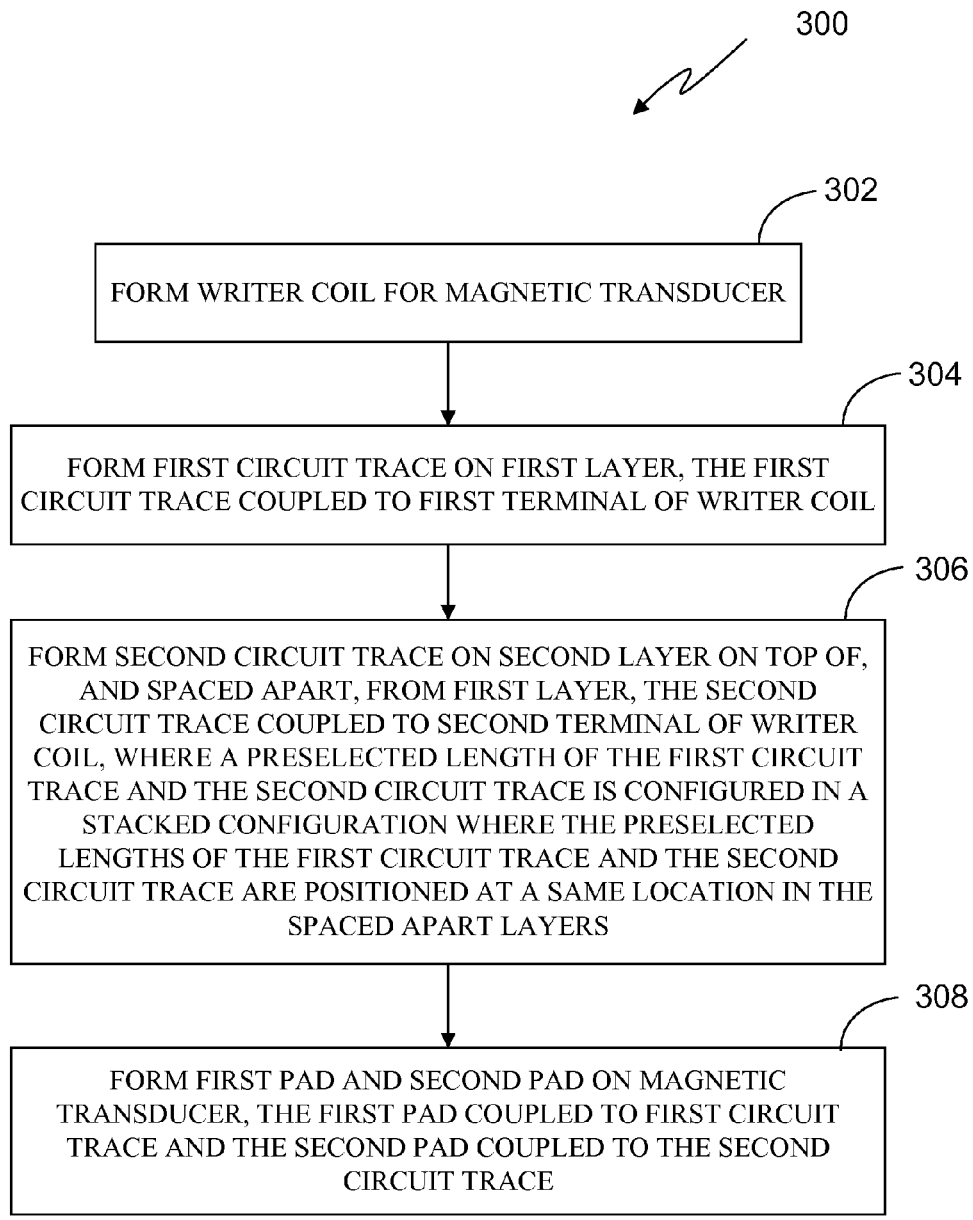
FIG. 5 is a flowchart of a process for manufacturing a writer coil with stacked leads in accordance with one embodiment of the invention.

FIG. 5 is a flowchart of a process 300 for manufacturing a writer coil with stacked leads in accordance with one embodiment of the invention. In particular embodiments, the process 300 can be used to form the write coil with stacked writer leads of FIG. 1. The process first forms (302) a writer coil for a magnetic transducer (e.g., slider). The process then forms (304) a first circuit trace on a first layer, where the first circuit trace is coupled to a first terminal of the writer coil. The process forms (306) a second circuit trace on a second layer on top of, and spaced apart, from the first layer, where the second circuit trace is coupled to a second terminal of the writer coil. In such case, a preselected length of the first circuit trace and the second circuit trace is configured in a stacked configuration where the preselected lengths of the first circuit trace and the second circuit trace are positioned at about the same location in the spaced apart layers. The process then forms (308) a first pad and a second pad on the magnetic transducer, where the first pad is coupled to the first circuit trace and the second pad is coupled to the second circuit trace. In one embodiment, the first pad and second pad are formed at different times and/or on different layers. In some embodiments, the pads can replaced by other suitable interconnect devices.

In some embodiments, the write coil and first circuit trace are both positioned on the first layer and may be formed at the same time. In other embodiments, the write coil and first circuit trace are not positioned on the same layer and are formed at different times. In a number of embodiments, the preselected length of the coupled traces is substantially greater than a width of either the first circuit trace or the second circuit trace. In one embodiment, the preselected length is about 225 microns. In another embodiment, the preselected length is about 170 microns. In some embodiments, the preselected length is selected based on a distance from the write coil terminals to the slider pads, or other intervening components that might inhibit the trace length and desired amount of coupling.

In several embodiments, the stacked configuration is configured to provide a preselected amount of capacitive coupling that corresponds to the preselected length. In such case, the preselected length and corresponding preselected amount of capacitive coupling are selected to compensate for the inductance of the writer coil. As a result, the stacked configuration can provide a better waveguide. In some embodiments, the effective circuit impedance including the writer coil can be reduced from about 50 ohms to about 25 ohms.

In one embodiment, the first circuit trace and the second circuit trace are spaced apart by a preselected distance that ranges from about 1 micrometer to about 4 micrometer. In some embodiments, the first and second pads are coupled to traces on a flexible circuit and configured to receive a pair of differential signals. In one embodiment, the first and second traces are about 14 microns wide and about 1 to about 1.5 microns thick. In other embodiments, the first and second traces can have other suitable dimensions.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 6:
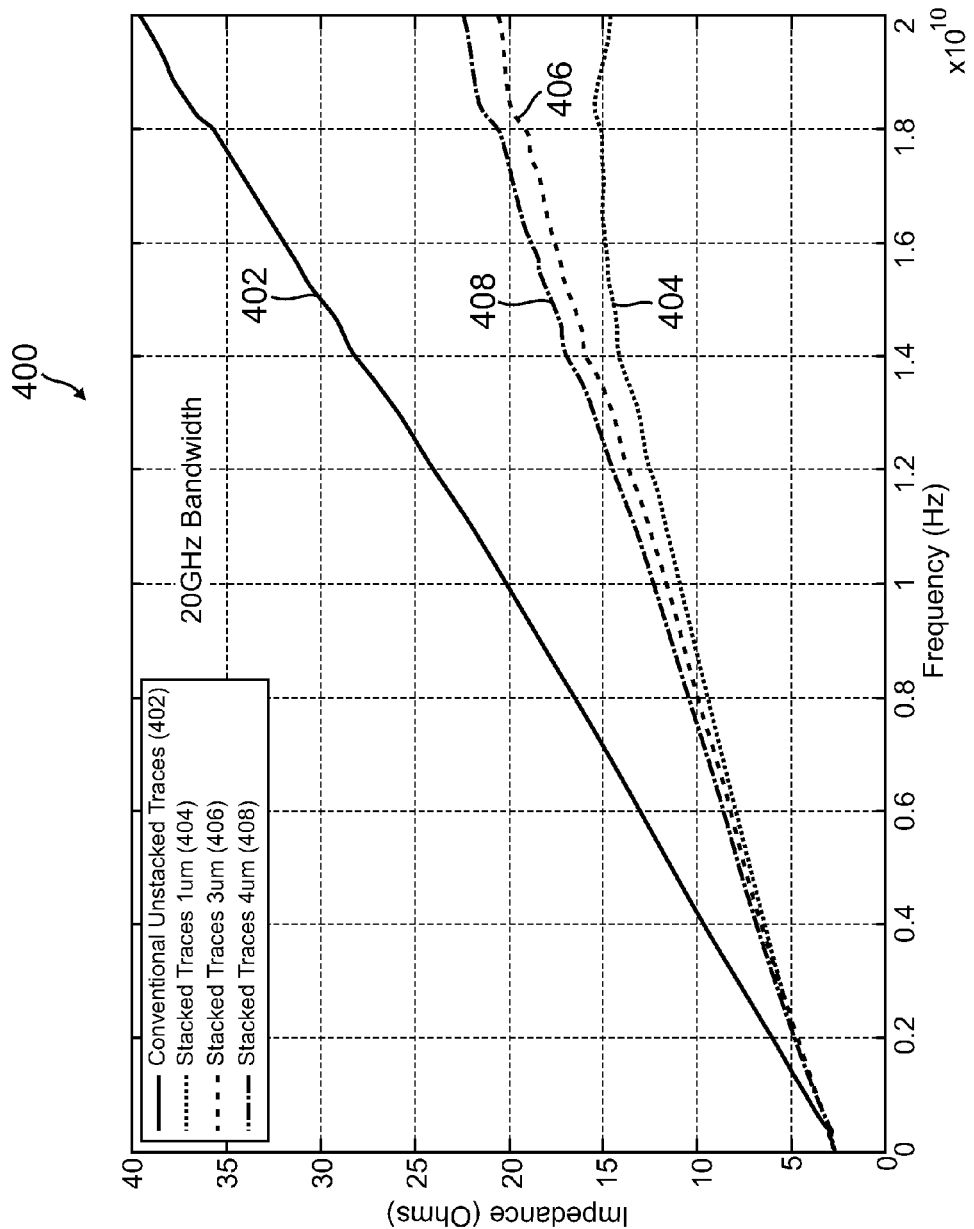
FIG. 6 is a graph illustrating the impedance of the write coil having the stacked writer leads for various separation distances as compared to a conventional write coil having unstacked writer leads in accordance with one embodiment of the invention.

FIG. 6 is a graph 400 illustrating the impedance of the write coil having the stacked writer leads/traces for various separation distances as compared to a conventional write coil having unstacked writer leads/traces in accordance with one embodiment of the invention. The vertical axis shows the impedance in ohms extending from zero up to 40 ohms, while the horizontal axis shows the frequency in hertz (Hz) extending from zero up to 20 GHz. As can be seen in FIG. 6, the impedance of the stacked writer traces spaced apart by 1 micron (404) is below the impedance of the stacked writer traces spaced apart by 3 microns (406), the impedance of the stacked writer traces spaced apart by 4 microns (408), and the impedance of the conventional write coil having unstacked writer traces (402). More specifically, in the range of about 10 GHz to 20 GHz, the impedance of the stacked traces spaced apart by 1 micron (404) is roughly half that of the conventional write coil having unstacked writer traces (402). The lower impedance provided by the writer coils with the stacked traces can allow for reading and writing information at higher data rates than conventional writer coils.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A system for providing stacked writer leads for a magnetic transducer, the system comprising:
   a writer coil for the magnetic transducer;
   a first pad on the magnetic transducer;
   a second pad on the magnetic transducer;
   a first circuit trace coupled to the first pad and a first terminal of the writer coil; and
   a second circuit trace coupled to the second pad and a second terminal of the writer coil,
   wherein a preselected length of the first circuit trace and the second circuit trace is configured in a stacked configuration where each of the preselected lengths of the first circuit trace and the second circuit trace is positioned at about a same location in spaced apart planes.

2. The system of claim 1, wherein, if the first circuit trace were projected onto the plane of the second circuit trace, the first circuit trace would occupy about the same location as the second circuit trace.

3. The system of claim 1, wherein, if the first circuit trace were projected onto the plane of the second circuit trace, the first circuit trace would occupy the same location as the second circuit trace.

4. The system of claim 1, wherein the preselected length is substantially greater than a width of either the first circuit trace or the second circuit trace.

5. The system of claim 1, wherein the stacked configuration is configured to provide a preselected amount of capacitive coupling that corresponds to the preselected length, and wherein the preselected amount of capacitive coupling is selected to compensate for an inductance of the writer coil.

6. The system of claim 1, wherein the first circuit trace and the second circuit trace are positioned on distinct layers that are spaced apart by a preselected distance that ranges from about 1 micrometer to about 4 micrometer.

7. The system of claim 1, further comprising a flexure, wherein the first and second pads are coupled to traces on the flexure, and wherein the first and second pads are configured to receive a pair of differential signals.

8. The system of claim 1, wherein the magnetic transducer is configured to write information on a magnetic medium of a storage drive.

9. The system of claim 1, wherein the magnetic transducer comprises an outer layer, and wherein the first and second pads are positioned along the outer layer.

10. The system of claim 1, wherein the first and second circuit traces comprise one or more conductive materials.

11. A method for providing stacked writer leads for a magnetic transducer, the method comprising:
    forming a writer coil for the magnetic transducer;
    forming a first circuit trace on a first layer, the first circuit trace coupled to a first terminal of the writer coil;
    forming a second circuit trace on a second layer on top of, and spaced apart, from the first layer, the second circuit trace coupled to a second terminal of the writer coil; and
    forming a first pad and a second pad on the magnetic transducer, the first pad coupled to the first circuit trace and the second pad coupled to the second circuit trace,
    wherein a preselected length of the first circuit trace and the second circuit trace is configured in a stacked configuration where the preselected lengths of the first circuit trace and the second circuit trace are positioned at about a same location in the spaced apart layers.

12. The method of claim 11, wherein the forming the writer coil for the magnetic transducer comprises forming the writer coil for the magnetic transducer on the first layer.

13. The method of claim 11, wherein the forming the writer coil for the magnetic transducer comprises:
    forming a first portion of the writer coil for the magnetic transducer on the first layer; and
    forming a second portion of the writer coil for the magnetic transducer on the second layer.

14. The method of claim 11, wherein, if the first circuit trace were projected onto the plane of the second circuit trace, the first circuit trace would occupy about the same location as the second circuit trace.

15. The method of claim 11, wherein, if the first circuit trace were projected onto the plane of the second circuit trace, the first circuit trace would occupy the same location as the second circuit trace.

16. The method of claim 11, wherein the preselected length is substantially greater than a width of either the first circuit trace or the second circuit trace.

17. The method of claim 11, wherein the stacked configuration is configured to provide a preselected amount of capacitive coupling that corresponds to the preselected length, and wherein the preselected amount of capacitive coupling is selected to compensate for an inductance of the writer coil.

18. The method of claim 11, wherein the first circuit trace and the second circuit trace are spaced apart by a preselected distance that ranges from about 1 micrometer to about 4 micrometer.

19. The method of claim 11, wherein the first and second pads are coupled to traces on a flexure, and wherein the first and second pads are configured to receive a pair of differential signals.

20. The method of claim 11, wherein the magnetic transducer is configured to write information on a magnetic medium of a storage drive.

21. The method of claim 11, wherein the magnetic transducer comprises an outer layer, and wherein the first and second pads are positioned along the outer layer.

22. The method of claim 11, wherein the first and second circuit traces comprise one or more conductive materials.

23. The method of claim 11, wherein the writer coil is configured to generate a magnetic field to write information on a magnetic medium of a storage drive.

24. The method of claim 11, wherein the writer coil is contained within the magnetic transducer.

25. The system of claim 1, wherein the writer coil is configured to generate a magnetic field to write information on a magnetic medium of a storage drive.

26. The system of claim 1, wherein the writer coil is contained within the magnetic transducer.

* * * * *